United States Patent
Kim

(10) Patent No.: US 10,129,456 B1
(45) Date of Patent: Nov. 13, 2018

(54) APPARATUS FOR ADJUSTING FOCUS OF CAMERA AND CONTROL METHOD THEREOF

(71) Applicant: Mando-Hella Electronics Corporation, Incheon (KR)

(72) Inventor: Shinwook Kim, Seoul (KR)

(73) Assignee: MANDO-HELLA ELECTRONICS CORPORATION, Incheon (KR)

( * ) Notice: Subject to any disclaimer, the term of this patent is extended or adjusted under 35 U.S.C. 154(b) by 0 days.

(21) Appl. No.: 15/848,264

(22) Filed: Dec. 20, 2017

(30) Foreign Application Priority Data

Sep. 12, 2017 (KR) ........................ 10-2017-0116349

(51) Int. Cl.
*H04N 5/232* (2006.01)
*G06T 7/13* (2017.01)
*G06T 7/11* (2017.01)

(52) U.S. Cl.
CPC ........... *H04N 5/23212* (2013.01); *G06T 7/13* (2017.01); *G06T 7/11* (2017.01); *G06T 2207/10004* (2013.01); *G06T 2207/10148* (2013.01); *G06T 2207/20036* (2013.01); *G06T 2207/20081* (2013.01); *G06T 2207/20084* (2013.01)

(58) Field of Classification Search
None
See application file for complete search history.

(56) References Cited

U.S. PATENT DOCUMENTS

2012/0020580 A1* 1/2012 Sasai ................... H04N 19/176
382/233

FOREIGN PATENT DOCUMENTS

JP 2009-69996 4/2009
JP 2010-91856 4/2010

OTHER PUBLICATIONS

Office Action dated Jun. 15, 2018 for Korean Patent Application No. 10-2017-0116349 and its English machine translation by Google Translate.

* cited by examiner

*Primary Examiner* — Mark T Monk
(74) *Attorney, Agent, or Firm* — Ladas & Parry, LLP

(57) ABSTRACT

Disclosed are an apparatus and method for adjusting the focus of a camera. The apparatus in accordance with one embodiment of the present disclosure includes an image acquirer; a neuromorphic hardware including a plurality of neurons; and a controller configured to generate input vectors by vectorizing image data, input each of the generated input vectors to the neuromorphic hardware, select neurons, receive an edge pattern type value between the input vector and one corresponding edge pattern from each of the selected neurons, calculate a focus parameter value of the image frame on the basis of the received edge pattern type values, compare the focus parameter value of a current image frame and a focus parameter value of a previous image frame, determine a moving direction of the focus lens according to a comparison result, and move the focus lens on the basis of the determined moving direction.

6 Claims, 3 Drawing Sheets

[FIG 1]
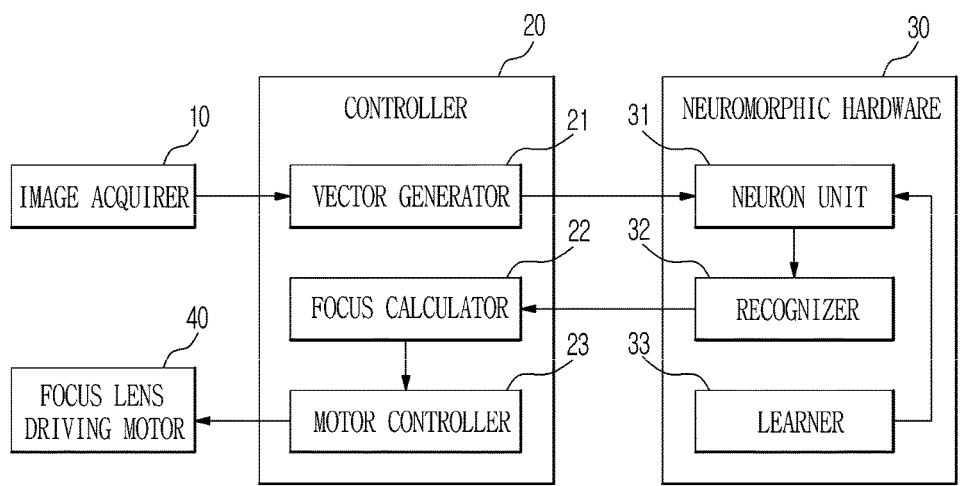

[FIG 2]
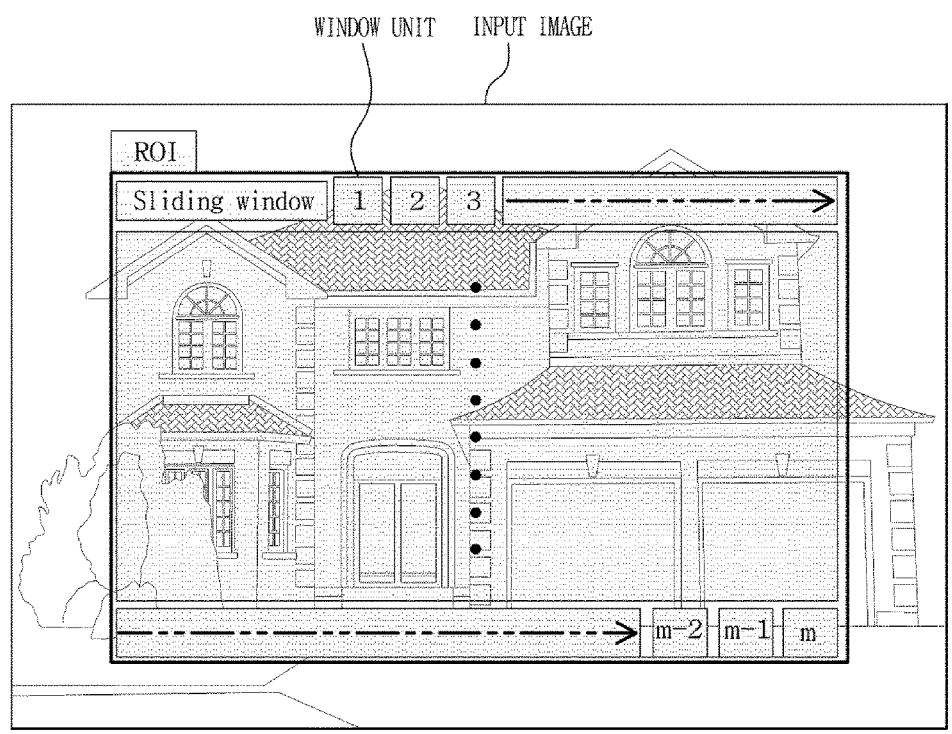

[FIG 3]
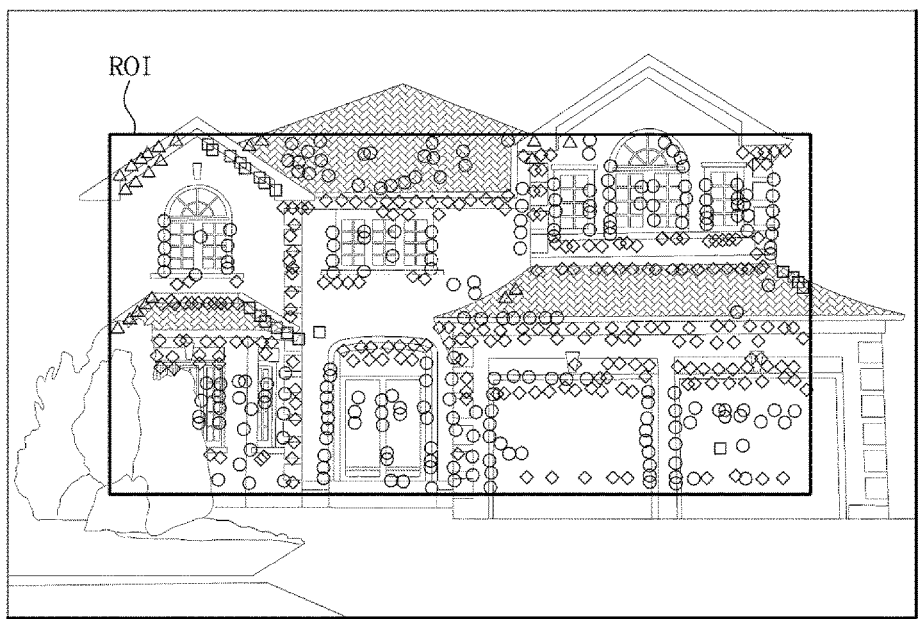

APPARATUS FOR ADJUSTING FOCUS OF CAMERA AND CONTROL METHOD THEREOF

CROSS-REFERENCE TO RELATED APPLICATION(S)

This application claims the benefit of Korean Patent Application No. 2017-0116349, filed on Sep. 12, 2017 in the Korean Intellectual Property Office, the disclosure of which is incorporated herein by reference.

BACKGROUND

1. Technical Field

The present disclosure relates to an apparatus and method for adjusting the focus of a camera, and more particularly, to an apparatus and method for automatically adjusting a focus of a camera.

2. Description of the Related Art

Generally, a distance between a camera and a subject affects a focus of the camera. That is, when the distance from the subject is increased or decreased, a camera lens appropriately moves back and forth to be in an optimal position so that an image is accurately brought into focus.

Conventionally, an edge of an image acquired through a lens is detected and an optical focus position is found by driving a focus lens to search for a point at which a corresponding edge value reaches a maximum value. That is, the focus lens repeats driving back and forth step-by-step through a step motor and obtains an edge value at each step, and the search is repeated until the edge value reaches a maximum value.

However, in the case of a fast-moving subject or a camera mounted in a fast-moving object, such as a vehicle or an aircraft, fast acquisition of a focus position is most important, and during this process, an excessive amount of computation or time delay for focus adjustment may occur.

SUMMARY

It is an aspect of the present disclosure to provide an apparatus and method for adjusting the focus of a camera which use neuromorphic hardware to reduce the amount of computation consumed in calculating edges of an image.

Additional aspects of the present disclosure will be set forth in part in the description which follows and, in part, will be obvious from the description, or may be learned by practice of the present disclosure.

In accordance with one aspect of the present disclosure, an apparatus for adjusting the focus of a camera which automatically adjusts a focus by moving a focus lens through a focus lens driving motor, the apparatus including: an image acquirer configured to obtain an image frame; a neuromorphic hardware including a plurality of neurons connected through a parallel bus, wherein the neurons store edge pattern vectors generated by vectorizing previously learned edge patterns capable of specifying edges of an image; and a controller configured to set a specific region as a region of interest (ROI) on the basis of a center of the image frame input from the image acquirer, segment the set ROI into units of predetermined windows, generate input vectors by vectorizing image data obtained from each of the windows by sliding the windows, input each of the generated input vectors to the neuromorphic hardware, select neurons, each having an edge pattern vector that is the most similar to each of the input vectors from the plurality of neurons, receive an edge pattern type value and a relative distance value between the input vector and one corresponding edge pattern from each of the selected neurons, calculate a focus parameter value of the image frame on the basis of the received edge pattern type values and the relative distance values, compare the focus parameter value of a current image frame and a focus parameter value of a previous image frame, determine a moving direction of the focus lens so that a focus with respect to the image frames increases according to a comparison result, and move the focus lens through the focus lens driving motor on the basis of the determined moving direction.

The controller may calculate the number of edge patterns of the image frame and an average of the relative distance values on the basis of the received edge pattern type values and relative distance values, and calculate the focus parameter value of the image frame on the basis of the calculated number of edge patterns and average value.

The controller may calculate the focus parameter value (F) through the following Equations 1 and 2:

$$F_m = N_F + \mu \frac{1}{D_F} \quad \text{Equation 1}$$

$$D_F = \frac{1}{N_F} \sum_{i=1}^{N_F} dist_i, \quad \text{Equation 2}$$

where $F_m$ represents a focus parameter calculation value of an $m^{th}$ frame, $N_F$ represents the number of windows recognized as edges by the neuromorphic hardware, $D_F$ represents an average of distance values of the windows recognized as edges, $dist_i$ represents a distance value of one window recognized as an edge, and u represents a coefficient for adjusting a ratio between two parameters having different physical characteristics.

Image edge pattern vectors stored in the plurality of neurons of the neuromorphic hardware may be one of vertical, horizontal, 45-degree diagonal, and 135-degree diagonal edge patterns.

In accordance with another aspect of the present disclosure, there is provided a method of controlling an apparatus for adjusting the focus of a camera which includes an image acquirer configured to acquire an image frame, a neuromorphic hardware configured to include a plurality of neurons connected through a parallel bus, wherein the neurons store edge pattern vectors generated by vectorizing previously learned edge patterns capable of specifying edges of an image, a focus lens driving motor configured to move a focus lens, and a controller, the method including: setting a specific region as a region of interest (ROI) on the basis of a center of the image frame input from the image acquirer; segmenting the set ROI into units of predetermined windows; generating input vectors by vectorizing image data obtained from each of the windows by sliding the windows; inputting each of the generated input vectors to the neuromorphic hardware; selecting neurons, each having an edge pattern vector that is the most similar to each of the input vectors from the plurality of neurons; receiving an edge pattern type value and a relative distance value between the input vector and one corresponding edge pattern from each of the selected neurons; calculating a focus parameter value of the image frame on the basis of the received edge pattern type values and the relative distance values; comparing the focus parameter value of a current image frame and a focus parameter value of a previous image frame; determining a moving direction of the focus lens so that the focus with respect to the image frames increases according to a comparison result; and moving the focus lens through the focus lens driving motor on the basis of the determined moving direction.

The calculation of the focus parameter value may include calculating the number of edge patterns of the image frame and an average of the relative distance values on the basis of the received edge pattern type values and the relative distance values, and the calculated focus parameter value of the image frame may increase as the calculated number of edge patterns increases and the average decreases.

BRIEF DESCRIPTION OF THE DRAWINGS

These and/or other aspects of the present disclosure will become apparent and more readily appreciated from the following description of the embodiments, taken in conjunction with the accompanying drawings of which:

FIG. 1 is a control block diagram illustrating an apparatus for adjusting the focus of a camera according to one embodiment of the present disclosure;

FIG. 2 is a diagram for describing a sliding order of windows with respect to a region of interest (ROI) of an input image in the apparatus for adjusting the focus of a camera according to one embodiment of the present disclosure; and FIG. 3 is a diagram for describing a recognition result of each window by neuromorphic hardware in the apparatus for adjusting the focus of a camera according to one embodiment of the present disclosure.

DETAILED DESCRIPTION

Hereinafter, embodiments of the present disclosure will be described in detail with reference to the accompanying drawings. The embodiments set forth herein are provided by way of example to enable those skilled in the art to fully understand the scope of the present invention. The present disclosure is not limited to the embodiments described herein and may be embodied in many alternate forms. Irrelevant details have been omitted from the drawings for increased clarity and conciseness. Widths, lengths, and thicknesses of components in the drawings may be exaggerated for convenience of description. Like numbers refer to like elements throughout the detailed description and the drawings.

An auto-focusing (AF) function is an essential function for maintaining an optimal focus in a platform where a subject moves and changes a distance from a camera or the camera moves.

Conventionally, auto-focusing has been implemented by measuring an edge value of a certain region designated in an image and moving a focus lens in a direction in which the edge value increases. Alternatively, a method of implementing auto-focusing by converting an image of a certain region into a frequency domain and moving a focus lens in a direction in which the frequency domain increases has been used.

However, recently, a resolution of a camera image has rapidly increased to 4K or more, and in the case of a camera mounted in a vehicle or an aircraft platform, a large amount of computation is required for implementing the auto-focusing function since a subject or the camera moves quickly. This may cause an increase in component price and an increase in development time.

Therefore, in one embodiment of the present disclosure, an edge value obtained through a conventional image processing algorithm operation is replaced with an edge shape pattern learning and recognition process through neuromorphic hardware, thereby making it possible to accelerate the auto-focusing without requiring computation.

In addition, by introducing a concept of a focus parameter corresponding to an edge value, a current focus state is defined by a simple operation using the number of patterns recognized as edges and a relative distance value in the neuromorphic hardware and an optimal focus position is searched for by comparing values on the basis of the current focus state.

FIG. 1 is a control block diagram illustrating an apparatus for adjusting the focus of a camera according to one embodiment of the present disclosure.

Referring to FIG. 1, an apparatus for adjusting the focus of a camera includes an image acquirer 10, a controller 20, neuromorphic hardware 30 which is a neuromorphic hardware, and a focus lens driving motor 40.

The image acquirer 10 includes an image sensor configured to acquire image frames. Light condensed through an optical lens is focused on a surface of the image sensor. The image sensor converts condensed light energy into an electrical signal and generates a digital image in the form of pixels. The image signal generated by the image sensor is transmitted to the controller 20.

The controller 20 performs the overall control of the apparatus for adjusting the focus of a camera.

The controller 20 may include a vector generator 21, a focus calculator 22, and a motor controller 23.

FIG. 2 is a diagram for describing a sliding order of windows with respect to a region of interest (ROI) of an input image in the apparatus for adjusting the focus of a camera according to one embodiment of the present disclosure.

Referring to FIG. 2, the vector generator 21 sets an ROI on image data, which is an input image generated by the image acquirer 10, segments a central portion of the set ROI into smaller windows, and converts a pixel value of each corresponding window into a vector form by sliding the windows according to an order of sliding. In this case, the numbers of sliding steps in an X-direction and in a Y-direction may be variably adjusted. In addition, pieces of image data obtained in units of smaller windows are each converted into a one-row vector form and continuously transmitted to the neuromorphic hardware 30. For example, when it is assumed that a 16×16 window repeats sliding with respect to the entire ROI, one input vector has a size of 1×256. Pieces of image data for the entire ROI are transmitted to the neuromorphic hardware 30 while the input vector repeats sliding.

Referring back to FIG. 1, the neuromorphic hardware 30 may include a neuron unit 31, a recognizer 32, and a learner 33. Thousands of neurons implemented in hardware are connected by a parallel bus to form the neuron unit. In addition, the learner 33 configured to learn a pattern and the recognizer 32 configured to recognize the pattern constituting the inside of the neuromorphic hardware.

Pattern information about an edge region, which is learned in advance, is stored in the learner 33. Edge pattern vectors stored in the learner 33 may be various edge pattern vectors according to change in angles in vertical, horizontal, and diagonal directions. Such various edge patterns may be obtained in advance and stored in the learner 33. For example, the learner 33 may store vertical, horizontal, 45-degree diagonal, and 135-degree diagonal pattern edges in a vector form. In this case, the edge patterns are stored such that the types thereof are distinguished from one another.

The learner 33 may use the stored edge pattern vectors to recognize edge patterns by loading the edge patterns into local memories of a plurality of neurons included in the neuron unit 31.

The input vector converted into units of windows and transmitted by the vector generator 21 of the controller 20 is input to the neuron unit 31. The input vector is simultaneously transmitted to all the neurons constituting the neuron unit 31 through an internal parallel bus of the neuromorphic hardware. Each of the neurons calculates a distance (dist) between an edge pattern vector stored in the neuron's memory and the input vector, and outputs a firing signal value and a calculated distance value when the calculated distance value is within an influence field of the corresponding neuron. The firing signal is a signal indicating that a distance between the edge pattern vector stored in the corresponding neuron and the input vector is within the influence field of the neuron.

The recognizer 32 collects the firing signals and the distance values received from the respective neurons of the neuron unit 31 and selects a neuron having the closest relative distance to the input vector from among all the neurons on the basis of a winner-take-all (WTA) method.

In this case, the selected neuron outputs a category (CAT) value indicating a type of pattern that the selected neuron has and a distance (dist) value. That is, when the input vector which is a partial region of the input image is input to the neuromorphic hardware 30, a similarity search is performed on various types of edge patterns possessed by the neurons to find an edge pattern most similar to an input value, and a CAT value and a distance (dist) value of an edge pattern with the most similarity are output when it is present.

FIG. 3 is a diagram for describing a recognition result of each window by the neuromorphic hardware in the apparatus for adjusting the focus of a camera according to one embodiment of the present disclosure.

Referring to FIG. 3, the neuromorphic hardware 30 recognizes a received input window vector, and when a similar edge pattern is present in a neuron of the neuron unit 31, the neuromorphic hardware 30 outputs type and relative distance (dist) values of the edge pattern. When one of vertical, horizontal, 45-degree diagonal, and 135-degree diagonal edge patterns are stored in the neurons, a type value (CAT value) of the corresponding edge pattern is output.

Referring back to FIG. 1, when the neuromorphic hardware 30 completes recognition of the entire ROI, the focus calculator 22 of the controller 20 calculates a focus parameter value through an operation on received pattern category (CAT) values and distance (dist) values.

A focus parameter value F is calculated by the following Equations 1 and 2.

$$F_m = N_F + \mu \frac{1}{D_F} \quad \text{Equation 1}$$

$$D_F = \frac{1}{N_F} \sum_{i=1}^{N_F} dist_i \quad \text{Equation 2}$$

Here, $F_m$ represents a focus parameter calculation value of an $m^{th}$ frame, $N_F$ represents the number of windows recognized as edges by the neuromorphic hardware, $D_F$ represents an average of the distance values of the windows recognized as edges, $dist_i$ represents a distance value of one window recognized as an edge, and u represents a coefficient for adjusting a ratio between two parameters having different physical characteristics.

The focus parameter value F is calculated by combining N which is the number of edge patterns detected in the corresponding ROI and the D value which is an average of relative distances (dist) between the learned/stored edge pattern and an edge component of an input image.

The larger the number of edge components detected in the image is, the better the focus is. Conversely, the smaller the relative distance between the learned edge and an edge component of the input image is, the better the focus is. Therefore, an N parameter and a D parameter are in inverse proportion to each other.

When the focus calculator 22 calculates a focus parameter value for the current image frame, the focus calculator 22 transmits the calculation result to the motor controller 23.

The motor controller 23 compares the focus parameter value of the current image frame received from the focus calculator 22 with a focus parameter value of a previous image frame.

The motor controller 23 determines whether the focus value is increasing or decreasing according to a comparison result, and determines a moving direction of the focus lens. That is, the motor controller 23 determines whether the focus is increasing or decreasing according to the comparison result and determines the moving direction of the focus lens to move the focus lens in a direction in which the focus increases.

The motor controller 23 generates motor driving information to move the focus lens in the determined moving direction and transmits the motor driving information to the focus lens driving motor 40. The motor driving information may include a rotation direction, the number of moving steps, and a rotation speed clock of the focus lens driving motor.

The focus lens driving motor 40 may include a step motor configured to move the focus lens.

The focus lens driving motor 40 moves the focus lens in the determined moving direction by rotating according to the motor driving information received from the motor controller 23.

As is apparent from the above description, according to one embodiment of the present disclosure, it is possible to implement an auto-focusing function without requiring complicated computation. Conventionally, an edge computation operation needed to be performed for the entire ROI through a matrix operation on all the image frames according to repeated motor step changes. In this case, when a resolution of the image is increased or multi-focusing areas are formed, the amount of computation is drastically increased, which is a major cause of difficulty in fast real-time processing.

In addition, according to one embodiment of the present disclosure, not only an edge operation can be replaced with a pattern matching function using the neuromorphic hardware, but also a focus parameter can be calculated through a simple operation, so that a focus state can be intuitively compared between frames.

Therefore, by driving a motor through hardware acceleration for an edge operation and comparison of simple focus parameter values, it is possible to implement an auto-focusing function without using a high-performance/ high-cost processor in an application in which a large image resolution is used or a fast auto-focusing function is required.

According to the embodiments of the present disclosure, it is possible to drastically reduce the amount of computation consumed in calculating edges of an image by using neuromorphic hardware and reduce the cost of system implementation.

Although a few embodiments of the present disclosure have been shown and described, it would be appreciated by those skilled in the art that changes may be made in these embodiments without departing from the principles and spirit of the present disclosure, the scope of which is defined in the claims and their equivalents.

What is claimed is:

1. An apparatus for adjusting the focus of a camera which automatically adjusts a focus by moving a focus lens through a focus lens driving motor, the apparatus comprising:
  an image acquirer configured to obtain an image frame;
  a neuromorphic hardware including a plurality of neurons connected through a parallel bus, wherein the neurons store edge pattern vectors generated by vectorizing previously learned edge patterns by which edges of an image are specifiable; and
  a controller configured to set a specific region as a region of interest (ROI) on the basis of a center of the image frame input from the image acquirer, segment the set ROI into units of predetermined windows, generate input vectors by vectorizing image data obtained from each of the windows by sliding the windows, input each of the generated input vectors to the neuromorphic hardware, select neurons, each having an edge pattern vector that is most similar to each of the input vectors from the plurality of neurons, receive an edge pattern type value and a relative distance value between the input vector and one corresponding edge pattern from each of the selected neurons, calculate a focus parameter value of the image frame on the basis of the received edge pattern type values and the relative distance values, compare the focus parameter value of a current image frame and a focus parameter value of a previous image frame, determine a moving direction of the focus lens so that a focus with respect to the image frames increases according to a comparison result, and move the focus lens through the focus lens driving motor on the basis of the determined moving direction.

2. The apparatus of claim 1, wherein the controller calculates the number of edge patterns of the image frame and an average of the relative distance values on the basis of the received edge pattern type values and relative distance values, and calculates the focus parameter value of the image frame on the basis of the calculated number of edge patterns and average value.

3. The apparatus of claim 2, wherein the controller calculates the focus parameter value (F) through the following Equations 1 and 2:

$$F_m = N_F + \mu \frac{1}{D_F} \quad \text{Equation 1}$$

$$D_F = \frac{1}{N_F} \sum_{i=1}^{N_F} dist_i, \quad \text{Equation 2}$$

where $F_m$ represents a focus parameter calculation value of an $m^{th}$ frame, $N_F$ represents the number of windows recognized as edges by the neuromorphic hardware, $D_F$ represents an average of distance values of the windows recognized as edges, $dist_i$ represents a distance value of one window recognized as an edge, and u represents a coefficient for adjusting a ratio between two parameters having different physical characteristics.

4. The apparatus of claim 1, wherein image edge pattern vectors stored in the plurality of neurons of the neuromorphic hardware are one of vertical, horizontal, 45-degree diagonal, and 135-degree diagonal edge patterns.

5. A method of controlling an apparatus for adjusting the focus of a camera which includes an image acquirer configured to acquire an image frame, a neuromorphic hardware configured to include a plurality of neurons connected through a parallel bus, wherein the neurons store edge pattern vectors generated by vectorizing previously learned edge patterns by which edges of an image is specifiable, a focus lens driving motor configured to move a focus lens, and a controller, the method comprising:
  setting a specific region as a region of interest (ROI) on the basis of a center of the image frame input from the image acquirer;
  segmenting the set ROI into units of predetermined windows;
  generating input vectors by vectorizing image data obtained from each of the windows by sliding the windows;
  inputting each of the generated input vectors to the neuromorphic hardware;
  selecting neurons, each having an edge pattern vector that is most similar to each of the input vectors from the plurality of neurons;
  receiving an edge pattern type value and a relative distance value between the input vector and one corresponding edge pattern from each of the selected neurons;
  calculating a focus parameter value of the image frame on the basis of the received edge pattern type values and the relative distance values;
  comparing the focus parameter value of a current image frame and a focus parameter value of a previous image frame;
  determining a moving direction of the focus lens so that a focus with respect to the image frames increases according to a comparison result; and
  moving the focus lens through the focus lens driving motor on the basis of the determined moving direction.

6. The method of claim 5, wherein the calculating of the focus parameter value includes calculating the number of edge patterns of the image frame and an average of the relative distance values on the basis of the received edge pattern type values and the relative distance values, and the calculated focus parameter value of the image frame increases as the calculated number of edge patterns increases and the average decreases.

* * * * *